April 2, 1935.   V. G. VAUGHAN   1,996,634
WATER HEATER CONTROL SYSTEM
Filed Oct. 29, 1930
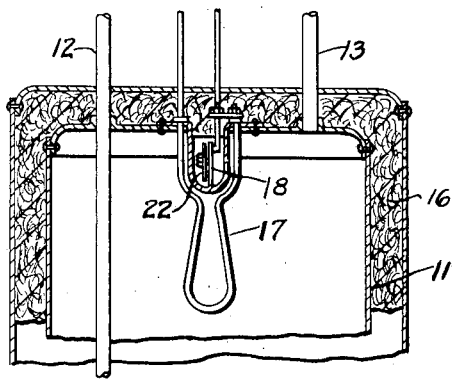
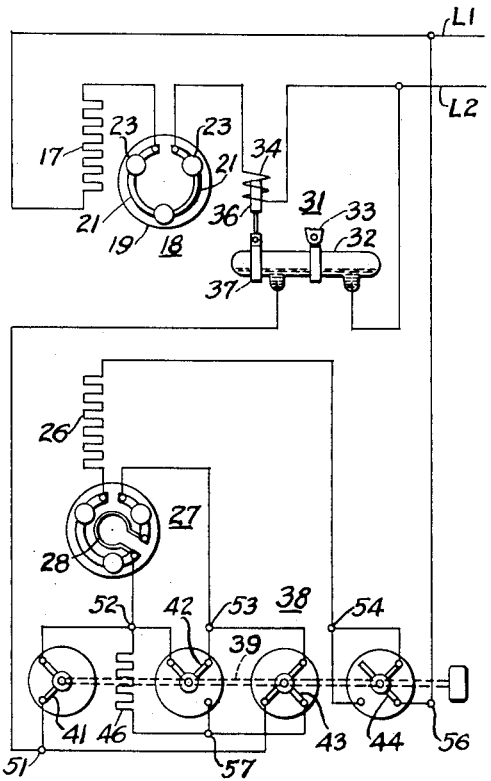
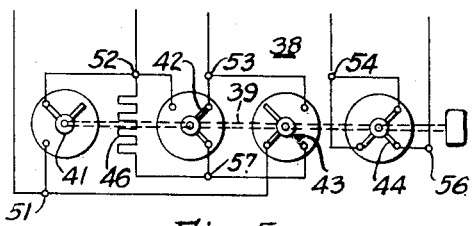
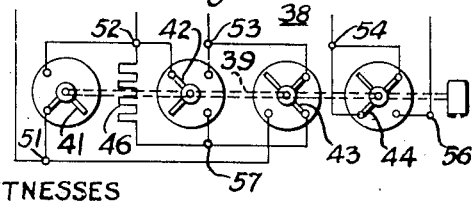
INVENTOR
Victor G. Vaughan
BY Wesley G. Carr
ATTORNEY Patented Apr. 2, 1935

1,996,634

UNITED STATES PATENT OFFICE 1,996,634

WATER HEATER CONTROL SYSTEM

Victor G. Vaughan, Mansfield, Ohio, assignor to Westinghouse Electric & Manufacturing Company, a corporation of Pennsylvania Application October 29, 1930, Serial No. 491,939

19 Claims. (Cl. 219—39)

My invention relates to water heaters and particularly to control systems for tank heaters.

An object of my invention is to provide a control system for a water heater that will limit the maximum energy input into a tank of water to be heated.

Another object of my invention is to provide a control system for a water heater that will effect selective energization of a plurality of electric heating units under predetermined conditions of demand for hot water.

In practicing my invention, I provide, in combination with a water tank that is preferably heat insulated, a lower and an upper electric heating unit, the upper unit being provided with a thermostatic control switch closely associated therewith. The lower heating unit is provided with a thermostatic switch and means operatively associated with the same to permit of varying the temperature at which it will operate. I provide also an electromagnetically controlled switch for controlling the circuit of the lower heater in accordance with the current traversing the upper heater.

In the single sheet of drawings,

Figure 1 is a view, in vertical section, through a tank installation with which is associated the system embodying my invention.

Fig. 2 is a schematic diagram of connections of the system embodying my invention, and Figs. 3, 4 and 5 are views of a manually operable control switch illustrating positions thereof which differ from that shown in Fig. 2 of the drawing.

Referring first to Fig. 1 of the drawing, I have there illustrated a tank 11 having a cold-water inlet pipe 12 and a hot-water outlet pipe 13 associated therewith. An external casing 14, which may be made of relatively thin sheet metal, surrounds the tank 11 and is spaced therefrom to permit of locating therebetween a mass 16 of a suitable heat-insulating material.

An upper electric heating element 17 has a thermostatic switch assembly 18 closely associated therewith, the structure being preferably that disclosed and claimed in my Patent No. 1,715,687 issued June 4, 1929. It is to be understood that the thermostatic switch 18 is effective to control the circuit of the heating element 17, which is shown as including a resistor (not shown in detail in Fig. 1 of the drawing, but shown schematically in Fig. 2 of the drawing) as being located within a suitable tubular metal casing.

The thermostatic switch assembly 18 may be of the kind shown in Patent No. 1,697,886 to J. A. Spencer, and includes a base 19, a plurality of arcuate contact members 21 thereon, a snap-acting bimetal disc 22 having contact bridging members 23 mounted thereon which either engage, or are disengaged from the stationary contact members 21. For further details of this construction, reference may be had to the above mentioned Spencer patent.

A lower heating unit 26 has another thermostatic switch assembly 27 operatively associated therewith which is of substantially the same general construction as element 18 but differs therefrom in being provided with a relatively small heating element 28, connected in the manner shown more particularly in Fig. 2, to connect it in circuit or to disconnect it from the circuit to permit of varying the temperature of the water at which the thermostatic switch will operate.

Reference may now be had to Fig. 2 of the drawing for a diagram of connections of the entire control system which may include supply-circuit conductors $L_1$ and $L_2$. An electromagnetic relay 31 includes a fluid switch 32, pivotally mounted on a suspension member 33, shown generally only, an actuating coil 34 and a movable core member 36 energized by the coil 34 and having a stirrup connection 37 to one end of the pivotally mounted switch 32 to permit of varying the position of the latter. The actuating coil 34 is connected in series-circuit with the thermostatic switch 18 and the resistor of heating unit 17, and all of these elements are connected to supply-circuit conductors $L_1$ and $L_2$.

The small auxiliary heater 28, associated with thermostatic switch 27, is controlled by a snap switch 38 which is shown in fully assembled position in Fig. 1 of the drawing but is shown in exploded position in Figs. 2 to 5, inclusive, of the drawing. The switch 38 comprises a single shaft 39, having a plurality of bridging members 41, 42, 43 and 44 located thereon, in coaxial spaced relation, to cooperate with a plurality of fixed contact members, which are indicated by the relatively small circles within the larger circles shown as surrounding the contact-bridging members 41 to 44, inclusive. Switches of this general kind are already well known in the art, and I have, therefore, shown a switch schematically only, as it constitutes, specifically, no part of my present invention.

A second small resistor 46 is provided which is connected in circuit with the control system, in a manner to be hereinafter set forth.

Let it be assumed that the tank 11 is filled with hot water and that, initially, the temperature of the water is sufficiently high to insure that switches 18 and 27 will have been actuated to their open positions. As is usual, the hotter water will be located at the top of the tank and this will, therefore, insure that the switch 18 will have been moved to its open position before switch 27 was moved to its open position. When switch 18 is open, coil 34 of relay 31 is deenergized, and current can flow through the resistor of heating unit 26, provided that switch 27 is in its closed position.

Let it be assumed that a relatively small quantity of water is drawn from the tank. This hot water will be drawn from the top of the tank rather than from the bottom, so that the thermostatic switch 18 will be maintained in its open position and, as soon as the temperature of the surrounding water and of switch 27 has dropped to the required value at which the latter will close, the heater 26 will be energized to heat the water in the bottom of the tank. In other words, the bottom heater will be effective during the times of ordinary demand for hot water from the tank to heat the water in accordance with the amount of energy expended in the resistor of heating unit 26, and, in accordance with the setting of switch 38, the effect of which is now to be described in detail.

Switch 38 is provided with five terminals, and connections are made from these terminals as is shown more particularly in Fig. 2 of the drawing. Terminal 51 is connected to one terminal of the fluid switch 32. Terminal 52 is connected to an auxiliary terminal of switch 27. Terminal 53 is connected to a main terminal of switch 27. Terminal 54 is connected to one terminal of heating unit 26, while terminal 56 is connected to supply-circuit conductor L₁. A sixth terminal 57 may be provided to be connected to one end of resistor 46, the other end of which is connected to terminal 52. Tracing the circuit of Fig. 2, which shows the condition when thermostatic switch 18 is in its open position, and thermostatic switch 27 is in its closed position, it will be noted that resistor 46 and auxiliary heating element 28 are short circuited.

Referring now to Fig. 3 of the drawing, switch 38 has been turned through one quarter turn and it will be noted that heating unit 28 of switch 27 and resistor 46 are connected in parallel-circuit relation to each other and in series with resistor of heating unit 26. The heating unit 28 is, therefore, energized to a predetermined degree and tends to raise the temperature of the bimetal disc to cause it to snap into its open position at a lower temperature of the surrounding water than was the case when connected as shown in Fig. 2.

Referring to Fig. 4 of the drawing, a similar tracing of the circuit of resistor 46 and heating unit 28 will show that heating unit 28 is alone connected in series circuit with the resistor of heating unit 26, and that resistor 46 is disconnected from the circuit. It is understood, of course, that switch 38 has been moved through another quarter turn. A larger value of current will, therefore, traverse heating unit 28 to cause it to have a greater effect upon the bimetal disc of switch 27, so that a lower temperature of the surrounding body of water will be sufficient to cause the switch to be moved to its open position.

Fig. 5 of the drawing shows the relatitve positions of the movable contact-bridging members when the switch has been given a third one quarter turn, in which case all of the circuits are open.

In case it happens that substantially all of the water in the tank has been withdrawn therefrom, as by an excessive demand, it will be apparent that the thermostatic switch 18, associated with the upper heater, will be moved to its closed position, whereby the resistor of heating unit 17 and the actuating coil 34 are both energized. The heating unit 17 will, therefore, heat a small quantity of water at the top of the tank in order to be ready to meet, to some degree, at least, a demand for hot water. The energized coil 34 will cause a tilting movement of switch 32, whereby the circuit through heating unit 26 and switch 27 is opened, thereby limiting the maximum input of energy which the tank may consume. As soon as the water in the top of the tank has been heated to a sufficient degree, switch 18 will open thereby permitting energization of heating unit 26, which will now become effective to heat the water remaining in the tank to the desired degree.

The device or system embodying my invention thus provides a relatively simple means for insuring that a reasonable supply of hot water shall be available at all times, and that at least a lesser quantity of hot water shall be made available within a short time after a sudden maximum demand has occurred. The system further provides means for limiting the maximum energy input which may be drawn from an energy-supply circuit.

Various modifications of my invention may be made without departing from the spirit and scope thereof, and I desire, therefore, that only such limitations shall be placed thereon as are imposed by the prior art, or are set forth in the appended claims.

I claim as my invention:

1. A water heater having a tank and electric heating units at the top and at the bottom portions thereof, a thermally-actuable switch controlling the circuit of the top heater and effective to interrupt the top heater circuit when the temperature of the water at the top of the tank is above a predetermined value, and an electromagnetic switch in the circuit of the bottom heater and controlled by the current traversing the top heater for interrupting the energization of the bottom heater upon energization of the top heater by reason of the water temperature in the top of the tank falling below a predetermined value.

2. A water heater including a tank, electric heating units for said tank at the top and at the bottom portions thereof, and thermally-actuated switches for controlling the respective heating units, a switch for controlling the circuit of the bottom heater and means controlled by the current traversing the top thermally-actuated switch for actuating the circuit-controlling switch of the bottom heater to its open position when the top heater is energized.

3. A water heater including a tank, heating units for the top and the bottom of the tank, thermally-actuable means operatively associated with the respective heaters for effecting deenergization of the lower heater and energization of the upper heater upon filling the tank with cold water and for effecting deenergization of the upper heater and energization of the lower heater upon heating of a predetermined quantity of water in the top of the tank to a predetermined temperature.

4. A water heater including a tank, heating units for the top and the bottom of the tank, thermally-actuable means operatively associated with the respective heaters for effecting deenergization of the lower heater and energization of the upper heater upon filling the tank with cold water and for effecting deenergization of the upper heater and energization of the lower heater upon heating of a predetermined quantity of water in the top of the tank to a predetermined temperature, and for deenergizing the lower heater upon heating of all of the water in the tank to a predetermined temperature.

5. A device as set forth in claim 4 in which the thermally-actuable means for the lower heater is provided with means for varying the temperature at which it will deenergize the associated heater.

6. A device as set forth in claim 4, in which the thermally-actuable means for the lower heater is provided with manually adjustable means for varying the temperature at which it will deenergize the associated heater.

7. A liquid heater comprising a tank, means for applying heat to different portions of said tank, means dependent upon the temperature of the liquid in one of said portions for controlling said heating means so that said heating means applies heat to said different portions selectively, and means dependent upon the temperatures of the liquid in said portions respectively for controlling said heating means so as to render the heating means for each portion ineffective when the liquid in that portion has attained a predetermined high temperature.

8. A liquid heater comprising a tank, heating means for the upper portion of said tank, heating means for the lower portion of said tank, and means responsive to the temperature of the liquid in the upper portion of said tank for controlling both of said heating means so that when the liquid in said upper portion has attained a predetermined high temperature the heating means for said portion is rendered ineffective and the heating means for said lower portion is rendered effective.

9. An electric liquid heater comprising a tank, electrical heating means for heating the liquid in the upper portion of said tank, electrical heating means for heating the liquid in the lower portion of said tank, means responsive to the temperatures of the liquid in the upper portion of said tank for controlling both of said heating means so that when the liquid in said upper portion has attained a predetermined high temperature the heating means for said upper portion is disconnected and the heating means for said lower portion is rendered effective, and means responsive to the temperature of the liquid in the lower portion of said tank for controlling the lower heating means so that said heating means is disconnected when the liquid in said lower portion attains a predetermined high temperature.

10. An electric water heater comprising a tank, an electrical heating element for the upper portion of said tank, a second electrical heating element for the lower portion of said tank, means responsive to the temperature of the water in the upper portion of said tank for controlling both of said heating elements and means responsive to the temperature of the water in the lower portion of said tank for controlling said second heating element.

11. An electric water heater comprising a tank, an electrical heating element for the upper portion of said tank, a second electrical heating element for the lower portion of said tank, means responsive to the temperature of the water in the upper portion of said tank for controlling both of said heating elements so that said upper element is deenergized and said lower element is energized when the temperature of the water in said upper portion has attained a predetermined high value, and a temperature cut out for said lower element responsive to the temperature of the water in the lower portion of said tank.

12. A water heater comprising a storage tank, a hot water draw off at the upper portion of said tank, a cold water inlet at the lower portion of said tank, means for applying heat to the upper and lower portions of said tank, means responsive to the temperatures of the water in said upper and lower portions for controlling said heating means so that in the event the cold water line reaches a predetermined level heat is applied only to the lower portion of said tank and in the event the cold water line reaches a higher predetermined level heat is applied only to the upper portion of said tank.

13. An electric water heater comprising a tank, an electrical heating element for the upper portion of said tank, an electrical heating element for the lower portion of said tank, means responsive to the temperature of the liquid in said upper portion for controlling both of said heating elements so that said upper element is deenergized and said lower element is energized when the water in said upper portion attains a predetermined high temperature, and upon the water in said portion attaining a predetermined low temperature said upper element is energized and the lower element is deenergized, and a temperature cut out responsive to the temperature of the water in the lower portion of said tank for shutting off said lower heating element when the temperature of the water in said lower portion attains a predetermined high value.

14. An electric water heater comprising a tank, an electrical heating element for the upper portion of said tank, an electrical heating element for the lower portion of said tank, thermostatic means responsive to the temperatures of the water in said upper and lower portions for controlling said heating elements so that when the temperature of the water in the upper portion of said tank reaches a predetermined low value said upper unit is energized so as to heat the water in the upper portion of said tank to a predetermined high value whereupon said element is deenergized and said lower element is energized to heat the water in the lower portion of said tank to substantially said predetermined high value whereupon said lower element is deenergized, and upon the water in the lower portion of said tank attaining a predetermined low temperature said lower element is reenergized.

15. A water heater comprising a storage tank, a hot water draw off at the upper portion of said tank, a cold water inlet at the lower portion of said tank, means for applying heat to the upper and lower portions of said tank, means responsive to the temperature of the water in said upper and lower portions for controlling said heating means so that while the hot water consumption does not exceed a predetermined rate, heat is applied only to the lower portion of said tank so as to maintain the hot water supply, but in the event the hot water consumption exceeds said predetermined rate, heat is applied only to the upper portion of said tank so as to heat that portion of the water which is available for immediate use.

16. An electric water heater as set forth in claim 10 in which the means responsive to the temperature of the water in the lower part of the tank is provided with manually adjustable means for varying the temperature of the water at which it will control the second heating means.

17. An electric water heater as set forth in claim 13 in which the temperature cut-out responsive to the temperature of the water in the lower portion of the tank is provided with manually adjustable means whereby it will be caused to shut off the lower heating element at a temperature of the water in the lower portion of the tank which is lower than said predetermined high value.

18. An electric water heater as set forth in claim 13 in which the temperature cut-out responsive to the temperature of the water in the lower portion of the tank is provided with an auxiliary current-traversed heating element located in heat transferring relation therewith and manually-actuable control means therefor to vary the temperature of the water in the lower portion of the tank at which it will shut off the lower heating element.

19. An electric water heater as set forth in claim 13 in which the temperature cut-out responsive to the temperature of the water in the lower portion of the tank is provided with an auxiliary electric heating element located in heat transferring relation therewith, a second auxiliary electric resistor out of thermal relation therewith, a manually actuable plural-contact plural-position switch and electric connections between the two auxiliary electric heating and resistor elements, the cut-out and the switch to vary the temperature of the water in the lower portion of the tank at which the cut-out will operate.

VICTOR G. VAUGHAN.